(12) United States Patent
Khan

(10) Patent No.: US 9,308,686 B2
(45) Date of Patent: Apr. 12, 2016

(54) APPARATUS AND PROCESS FOR JOINING HOMOGENEOUS AND HETEROGENEOUS MATERIALS WITH CUSTOMIZED INTERFACE PROPERTIES

(71) Applicant: Tata Technologies Pte Ltd, Singapore (SG)

(72) Inventor: Ishtiaq Ahmed Khan, Maharashtra (IN)

(73) Assignee: TATA TECHNOLOGIES PTE LTD, Singapore (SG)

(*) Notice: Subject to any disclaimer, the term of this patent is extended or adjusted under 35 U.S.C. 154(b) by 441 days.

(21) Appl. No.: 13/952,235

(22) Filed: Jul. 26, 2013

(65) Prior Publication Data
US 2014/0034215 A1 Feb. 6, 2014

(30) Foreign Application Priority Data
Jul. 26, 2012 (IN) .......................... 2140/MUM/2012

(51) Int. Cl.
*B32B 37/00* (2006.01)
*B29C 65/06* (2006.01)
*B23K 20/12* (2006.01)

(52) U.S. Cl.
CPC .................. *B29C 65/06* (2013.01); *B23K 20/12* (2013.01); *B23K 20/128* (2013.01); *B23K 20/1265* (2013.01)

(58) Field of Classification Search
CPC .... B29C 65/06; B23K 20/12; B23K 20/1265; B23K 20/128

USPC ................................ 156/73.5; 228/2.1, 112.1
See application file for complete search history.

(56) References Cited

U.S. PATENT DOCUMENTS

| 6,095,395 | A | 8/2000 | Fix, Jr. | |
| 6,892,924 | B2 | 5/2005 | Stevenson et al. | |
| 2008/0023524 | A1* | 1/2008 | Ohashi | B23K 20/1245 228/2.1 |
| 2008/0135601 | A1* | 6/2008 | Chen | B23K 20/1235 228/102 |
| 2010/0089977 | A1* | 4/2010 | Chen | B23K 20/122 228/114.5 |
| 2015/0183053 | A1* | 7/2015 | Kumagai | B23K 20/1265 228/112.1 |

FOREIGN PATENT DOCUMENTS

CN 101670482 3/2010

* cited by examiner

*Primary Examiner* — James Sells
(74) *Attorney, Agent, or Firm* — Ditthavong & Steiner, P.C.

(57) ABSTRACT

An apparatus and method for improving friction spot welding process is described herein. According to the method of the present invention, two different metal sheets of similar or dissimilar material can be joined together with the help of a filler material that is filled in a cavity formed at the top of the upper metal sheet. Additionally, either a reinforcement material or an alloy element or combination of both is added in the cavity. The material is plasticized as the filler material is rotated and pushed in the cavity under the application of force. The weld is completed by filling the entire filler material at the weld interface. The addition of reinforcement material or an alloy element enables in customization of interface material properties enhancing the joint strength.

18 Claims, 9 Drawing Sheets

APPARATUS AND PROCESS FOR JOINING HOMOGENEOUS AND HETEROGENEOUS MATERIALS WITH CUSTOMIZED INTERFACE PROPERTIES

FIELD OF THE INVENTION

The invention generally relates to the field of friction stir spot welding process. More particularly, the invention relates to a process and apparatus for joining of weldable or non-weldable, similar or dissimilar materials using an improved friction stir spot welding process and enabling a better provision at the weld interface in order to customize and enhance the interface properties.

BACKGROUND OF THE INVENTION

Aerospace, automotive and other industries have been continuously exploring the opportunities to reduce manufacturing cost of various parts, segments, assemblies and sections of end products manufactured. Moreover, these industries have been seeking the opportunities to reduce the weight of the components by replacing conventional materials utilized for manufacturing with other materials such as aluminum, magnesium, composites, etc., which necessitates joining of these parts.

For example, in an automotive industry, a body structural weight can be reduced by replacing conventional steel with aluminum particularly for a closure panel such as roof, deck lid, etc. However, it is very difficult to completely replace steel with aluminum or composite material because of various strength requirements defined by certain regulations and standards such as Federal Motor Vehicle Safety Standards (FMVSS), ECE etc. Therefore combination of advanced high strength steel (AHSS) and aluminum has been looked as a feasible solution for enabling weight reduction of the components and thereby the manufacturing cost. But there are challenges when it comes to joining of these materials.

Conventionally, for spot joining of plates made of aluminum alloy or the like, a resistance spot welding or a mechanical fastening using rivets is employed. The resistance spot welding method have high running cost due to need for a power supply of a large capacity in spot joining, short life duration of welding electrodes due to contamination or wear-out, and a need for utilities such as water and air in addition to a welding power. In the resistance spot welding method, since indentations remain on joined portions, this method is undesirable particularly when applied to outer plates for automobile in addition to creating an uneven geometry; the indentation also deteriorates its external appearance.

In particular case of resistance spot joining of aluminum alloy, as the electrodes significantly wear out after continuous use, its ability to perform continuous spotting is low. When current is conducted, it flows through spots close to a spot to be conductive, that is, current is shunted. Hence, it is impossible to place the spots close to one another. Hence, a required strength is not obtained. Further, the resistance spot welding process is not suitable for welding aluminum to aluminum and aluminum to steel. Therefore, the resistance spot welding was replaced by a friction stir spot welding process.

FIG. 1 illustrates a conventional friction stir spot welding process for combination of Al6061 and steel. As illustrated in FIG. 1, at step (101), upper Al6061 sheet (1) and a bottom steel sheet (2) to be welded are clamped together. Further, the weld cycle is started at step (102), wherein a non-consumable tool (3) made of Polycrystalline Cubin Boron Nitride (PCBN) material is pushed in the direction of the two sheets under a strong compressive force. When a pin section (4) of said tool (3) is in contact of the upper Al6061 sheet (1), the upper Al6061 sheet (1) is plasticized and the material under the pin (4) is softened that facilitates the penetration of the tool at the interface of the two Al6061 sheets.

As illustrated in FIG. 1, at step (103), greater heat is generated as the shoulder (5) section of the tool (3) is in contact with the upper Al6061 sheet (1). The heat is generated due to friction between the contacting surfaces of the upper sheet (1) and the tool (3). As a result of this, the material around the pin (4) is pushed and stirred to form a metallurgical bond joining the two Al6061 sheets and thereby completing the welding process.

Further, as illustrated in FIG. 1, after the completion of the welding process, at step (104), the tool (3) is retracted from the weld region. Upon completion of the welding process, a void is observed at the welded surfaces resulting into unreliable welding.

However, the conventional friction stir spot welding process is not reliable for joining two dissimilar materials with high weld strength. The conventional friction stir spot welding process results in the formation of void in the weld region.

FIG. 2(a) and FIG. 2(b) illustrates weld specimens (201) and (204) formed due to joining of Al6061 and steel material using a conventional friction stir spot welding process. The weld specimens welded are cut perpendicular to top surface of the upper Al 6061 sheet and passing through the center of the weld. As illustrated from FIG. 2(a), a void (202) is formed at the center of the weld. Further, there is lack of bond in the weld region. Further, as can be observed from FIG. 2(a), unbound region (203) can be seen in the weld interface of the two sheets. Such unbound region is formed due to the presence of oxide layers since there is no relative motion between the interface surfaces in the conventional spot welding process.

FIG. 2(b) illustrates a weld specimen (204) formed by the conventional welding process that is subjected to microstructure analysis. As illustrated in FIG. 2(b), a very small contact zone (205) is formed in the welding region of the two welded materials. The weld contact zone in this type is very small and it is only at the inner periphery and at the adjacent interface surface indicated as (205). Due to small contact zone, the weld strength is low and it also leads to unreliability of weld joint.

Therefore, the conventional friction stir spot welding process has following limitations:

Very small contact zone between the adjoining material surfaces.
Ineffective removal of oxides and other contamination from the weld interface (as there is no relative motion between the interface materials)
Lower weld strength
Poor mixing of materials (sheets) used for lap joint welding (as there is no relative motion between them)
Large heat effected zone
The conventional friction spot welding process lack in joining of two non-weldable dissimilar materials.

In view of the above limitations (except joining of two non weldable dissimilar materials), a refill friction stir spot welding process is employed, In refill friction spot welding the cavity is refilled during the welding process, but it still has the tendency of void formation, as sometimes it fails to refill completely the plasticized material in the cavity resulting in the void at the middle of the upper and bottom sheet of lap joint.

FIG. 3 illustrates joining of two materials (301, 302) using the refill friction stir spot welding process. As illustrated, there is tendency of a void or cavity (303) formation in the middle of the weld region. An ultrasonic method or x-ray technique is required to detect such defects as the void formed is not visible from exterior of the welded component which if goes undetected may be fatal in certain critical applications as 100% inspection of such defects is not possible. For example, considering the aerospace applications, joining of different parts or segments of different material for the manufacture of aircrafts or aerospace vehicles using refill friction stir welding process may result in unreliable weld joint. Further, the inspection of such thousands of spot joints may be cumbersome task and hence may require more time and cost. Thus, the refill friction stir spot welding still may not be reliable method for spot welding particularly in critical applications such as aerospace. Further, like the conventional friction stir spot welding process, the refill friction stir spot welding process also lacks in joining of two non-weldable dissimilar materials.

Further, the conventional friction stir spot welding processes has limitation of penetrating a filler material into an upper sheet in scenarios wherein the filler material has hardness properties equivalent to that of the upper sheet. More specifically, when the filler material having hardness similar to the upper material is penetrated into the upper material, the plasticization of the filler material takes place and the material is deformed on top of the upper material. Thus, the filler material is not penetrated and hence joining of two materials is difficult in such scenarios. Also, there is no provision in the conventional friction stir spot welding to customize the weld interface properties and thereby enhance the interface material properties.

Thus, in view of this, there is a long-felt need for an improved, novel friction stir spot welding process that addresses the lacunae observed in the conventional friction spot welding and refill friction stir spot welding processes that mainly adheres to limitation of joining non-weldable dissimilar materials. Further, there is a need to facilitate a better provision at the weld region to enable customization of interface material properties.

OBJECTS OF THE INVENTION

The principal object of the present invention is to provide a process and apparatus that enables void less friction stir spot welding in the weld region used for joining of two weldable or non-weldable, similar or dissimilar materials using a third material that is weldable to both the materials or at least to the bottom material.

Yet another object of the present invention is to provide a process and apparatus that enables formation of joint region of unique geometry by removing the upper portion of a first material and optionally some portion of a second material to create a cavity at the interface of the first and the second materials.

Yet another object of the present invention is to provide a process and apparatus that enables a pushing of a rotating tapered cylindrical filler material having geometry similar but having slightly bigger size than that of said joint region in the direction of the joint region until it touches the first material.

Yet another object of the present invention is to enable penetration of the rotating tapered cylindrical filler material at the interface of the joint region as a result of plasticization of materials due to heat generated at the weld interface.

Yet another objective of the present invention is to enable a better provision in the joint region enabling addition of reinforcements or alloying elements or combination of both to enhance the interface material properties of the joint region by customization of the interface material properties.

Yet another object of the present invention is to provide a process and apparatus that enables filling of the filler material completely in the joint design thereby completing the spot welding process.

Still another objective of the present invention is to provide a process and apparatus that enables a resultant structure due to said customization at the weld interface that can be either a composite or an alloy or combination of both.

SUMMARY OF THE INVENTION

Before the present process and apparatus enablement are described, it is to be understood that this invention is not limited to the particular apparatus, and process described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention enables a process and apparatus for enabling improvement in the conventional friction stir spot welding process. According to the method of the present invention, the two materials to be joined are clamped together. A portion of the upper material and optionally some portion of the bottom material are removed using a tool, such removed portion is preferably of uneven geometry intended to offer greater horizontal as well as vertical inter-surface contact. Upon removing the cut portion, both upper and bottom materials is left with cavity; said cavity facilitates an entry of a tapered cylindrical filler material to frictionally weld the upper and bottom material with each other. The tapered cylindrical filler material is adapted to have geometry similar and having slightly bigger size than that of the removed portion and is rotated and pushed into the cavity by applying a compressive force. As a result of a contact of the tapered cylindrical filler material with the adjoining part of the two materials, heat is generated due to friction between the two materials resulting into plasticization of the filler material. The plasticization further enables penetration of the tapered cylindrical filler material at the interface of the two materials. The shape of the geometry ensures that the filler material is properly welded at the interface with desired material properties and achieves better plasticization of the joining materials. According to the process of the present invention, there is a provision at the interface region of both the materials to add either reinforcements or alloying elements or combination of both based on requirements that enable enhancement in the material properties at the interface. The geometry provides good contact area for both upper and bottom materials to be joined.

Further, large heat is generated once the shoulder portion of the filler material comes in contact with one of the materials which results in the plasticization of interface material. The plasticization of interface material allows further penetration of the filler material which is compressed and stirred to form inter-material bond and weld is completed as the filler material is joined with the adjoining materials at the interface of the cavity. Further, addition of reinforcements or alloying elements or combination of both in the joint region facilitates customized interfacing properties resulting into formation of a structure that can be either a composite or an alloy or combination of both.

BRIEF DESCRIPTION OF DRAWINGS

The foregoing summary, as well as the following detailed description of embodiments, is better understood when read in conjunction with the appended drawings. For the purpose of illustrating the invention, there is shown in the drawings example constructions of the invention; however, the invention is not limited to the specific methods and architecture disclosed in the drawings.

DETAILED DESCRIPTION

Figure 1:
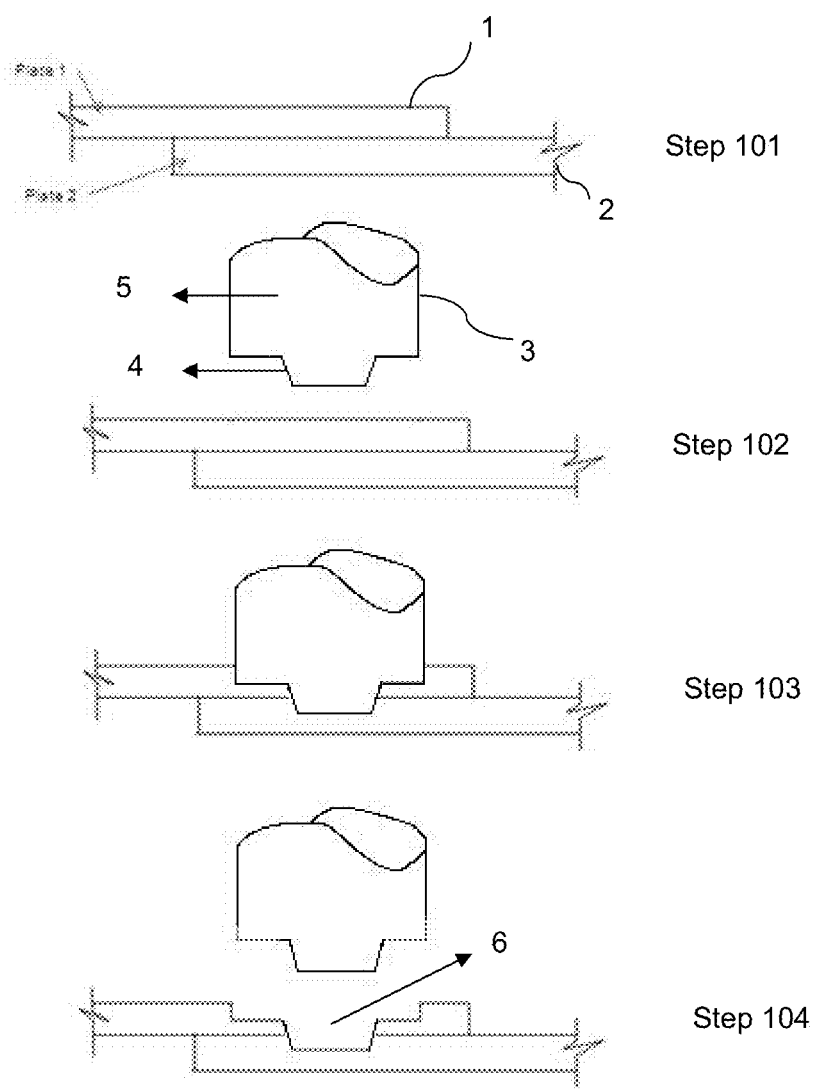
FIG. 1 illustrates a conventional friction stir spot welding process for combination of Al6061 and steel.
Figure 2A:
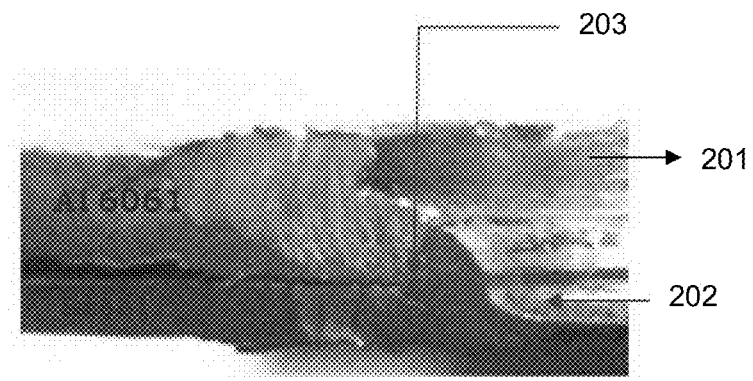
FIG. 2(a) and FIG. 2(b) illustrate weld specimens (201) and (204) formed due to joining of Al6061 and steel material using a conventional friction stir spot welding process.
Figure 2B:
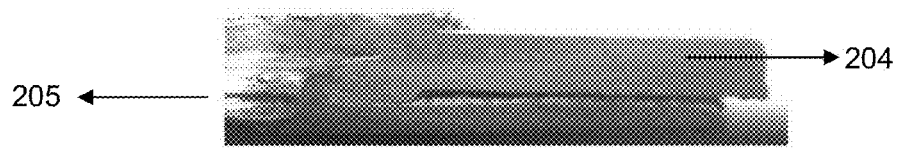
Figure 3:
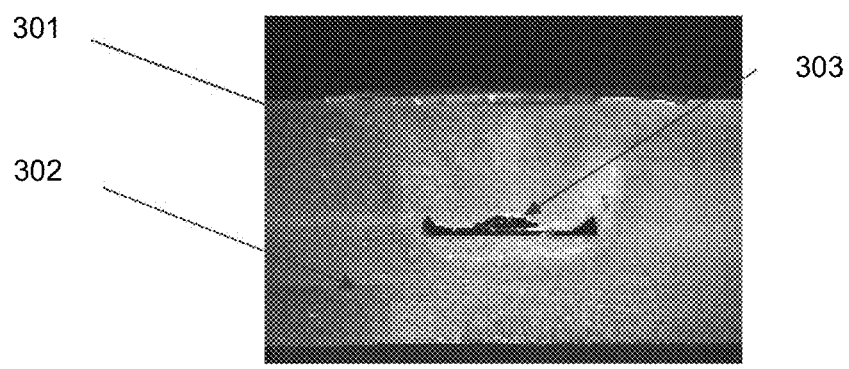
FIG. 3 illustrates joining of two materials (301, 302) using the refill friction stir spot welding process.

The description has been presented with reference to embodiments of the invention. Persons skilled in the art and technology to which this invention pertains will appreciate that alterations and changes in the described method and apparatus of operation can be practiced without meaningfully departing from the principle spirit and scope of this invention.

The present invention enables a process and apparatus for joining of materials such as composites, plastics, metals and combinations thereof using the novel friction spot welding process. The apparatus of the present invention comprises a welding-machine attached with a tapered cylindrical filler material that collectively implements the process of friction stir spot welding. According to one embodiment of the invention, the two materials to be joined are clamped together with one material being placed at the top of the other. In this embodiment, a portion of the upper material and optionally some portion of the bottom material are removed using a tool in order to form a unique joint region of pre-defined geometry at the interface of the two materials. Upon removing the portions, both upper and bottom materials is left with a cavity created in the joint region.

In an embodiment of the invention, the tapered cylindrical filler material possesses geometry similar to that of the joint region formed. The tapered cylindrical filler material is weldable either to both of the materials or at least to the bottom material to enable interlocking joint between upper and bottom materials. In this embodiment, the size of the tapered cylindrical filler material is slightly bigger than the joint region formed at the interface surfaces of the two materials.

In an embodiment, the tapered cylindrical filler material is pushed in the direction of the joint region by rotating the filler material in combination with application of compressive force using the welding-machine. As-soon-as the tapered cylindrical filler material touches the upper material; heat is generated due to the friction between the contacting surface of the cylindrical filler material and the upper material. Due to the generation of heat, the tapered cylindrical filler material is plasticized facilitating the penetration of the tapered cylindrical filler material at the interface of two materials. In this embodiment, the depth of penetration of the tapered cylindrical filler material is dependent on the properties of the two materials to be joined and the penetration is up to the extent that will enable efficient joining of the two materials clamped together.

In an embodiment, as the tapered cylindrical filler material is further penetrated in the interface region of the two materials clamped together, much more heat is generated and plasticization of material occurs and the interface material is softened. The rotation of the filler material is stopped as-soon-as the filler material is penetrated at the interface of the two materials as required. In an embodiment, the filler material is weldable either to both of the materials or at least to the bottom material to provide interlocking between the filler material and one of the two materials weldable to the filler material that creates the formation of inter-material bond at the joining surface. Thus, the filler material is pushed and stirred to form inter-material bond at the interface of two materials.

In an embodiment, following the formation of the inter-material bond, the filler material is completely filled in the cavity formed at the joint region to complete the friction stir spot welding process. Thus, the two materials are welded and joined together. A proper mixing of the two materials is achieved due to uneven geometry of the filler material that ensures proper welding joint. The two materials are joined together in such a manner that enables high weld strength, proper mixing of the materials, avoiding formation of void in the weld region and the effective removal of oxides and contamination from the weld region.

In one of the embodiment of the present invention, a better provision is provided in the joint region that enables addition of either reinforcements or alloying elements or combination of both that facilitates customization of interface properties at the joint region. The resultant structure formed due to customization of interface materials can either be a composite or an alloy or combination of both that has more efficient material properties. More particularly, addition of such reinforcements or alloying elements or combination of both enables in enhancement of the properties of interface materials.

Figure 4:
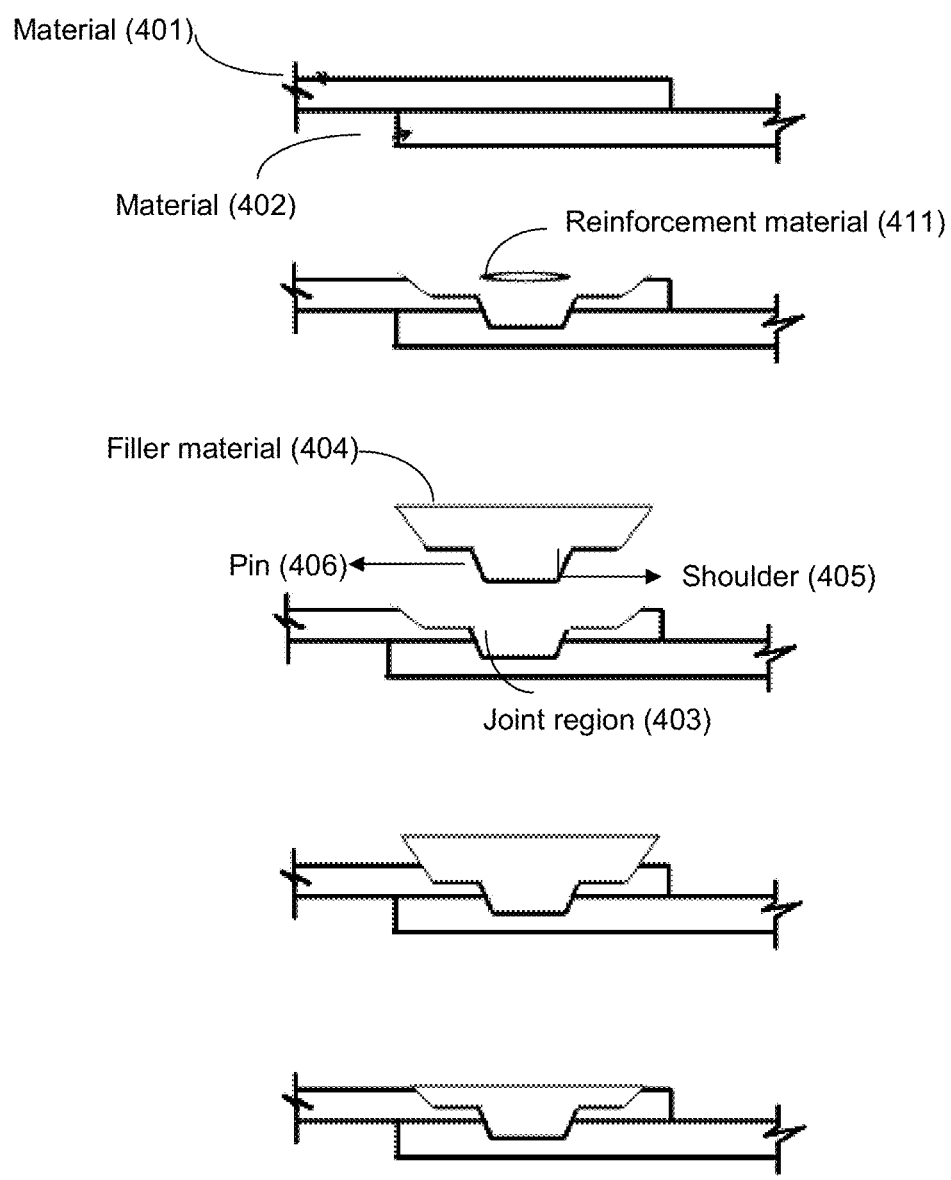
FIG. 4 is a block diagram (400) illustrating a novel friction stir spot welding process for joining of homogeneous or heterogeneous materials according to an exemplary embodiment of the invention.

Referring to FIG. 4 is a block diagram (400) illustrating various steps implemented by a novel friction stir spot welding process for joining of any two materials according to an exemplary embodiment of the invention.

As illustrated in FIG. 4, consider a material (401) and an another material (402) is to be joined together using the novel friction stir spot welding process in accordance with an exemplary embodiment of the present invention. In an exemplary embodiment, the friction stir spot welding process is implemented by using an apparatus comprising of a welding-machine (not shown in FIG. 4) attached to a tapered cylindrical filler material (404). In alternative embodiments of the present invention, the two materials (401) and (402) to be joined together can be of similar or dissimilar materials. Further, the two materials may be weldable or non-weldable to each other. For example, the materials (401) and (402) can be of any material type such as metals, composites, plastics and combinations thereof. In an exemplary embodiment, the two materials to be joined using the novel friction stir spot welding can be of any type, shape, size and of different materials.

In an exemplary embodiment, as illustrated in FIG. 4, the two materials (401) and (402) to be joined are clamped together by placing one material (401) hereinafter referred to as the upper material on top of the other material (402) hereinafter referred to as the bottom material. As can be observed in FIG. 4, according to an exemplary embodiment, a portion of the upper material and optionally some portion of the bottom material are removed by means of a tool. As a result of removal of these portions, a unique joint region (403) is formed at the interface of the two materials in accordance with an exemplary embodiment of the present invention. Upon removing the portions, both upper and bottom materials is left with a cavity created at the joint region (403).

In accordance with another exemplary embodiment of the present invention, some portion of the upper material (401) is removed while keeping the bottom material (402) intact. In such scenario, the joint region (403) formed does not interfere the region of the bottom material (402). More specifically, the joint region is formed (403) at the region constituting the bottom periphery of the upper material (401) and the receiving surface of the bottom sheet (402).

In an exemplary embodiment, the tapered cylindrical filler material (404) utilized for implementing the novel friction spot welding process is selected having pre-defined geometry similar to said unique joint region (403) as illustrated in FIG. 4. However, the size of the tapered cylindrical filler material (404) is slightly higher than that of the joint region (403) formed. In alternative embodiments, the tapered cylindrical filler material is selected from a group consisting of metals, plastics, composites and combinations thereof. Further, the selected material can be of any type, shape and size.

In accordance to an exemplary embodiment, as illustrated in FIG. 4, the cylindrical filler material (404) comprises an upper section in the form of a shoulder (405) and the lower section at the bottom of the shoulder (405) in the form of a pin (406). In an exemplary embodiment, the tapered cylindrical filler material is selected that is either welded to both of the materials (401) and (402) or at least the bottom material (402).

In an exemplary embodiment, as illustrated in FIG. 4, the tapered cylindrical filler material (404) is rotated and pushed in the direction of the two materials (401) and (402) using the welding-machine (not shown in FIG. 4). In this exemplary embodiment, holding of the tapered cylindrical filler material (404) by the welding machine will be dependent on the application of the friction stir spot welding. The tapered cylindrical filler material (404) is pushed by rotating the filler material (404) in combination with application of compressive force. As a result of the rotational motion in combination with compressive force, the tapered cylindrical filler material (404) is moved under pressure until it touches the upper material (401) to be joined with the bottom material (402).

In an exemplary embodiment, as a result of strong compressive force, as-soon-as the tapered cylindrical filler material (404) touches the upper material (401); heat is generated due to the friction between the contacting surface of the tapered cylindrical filler material (404) and the upper material (401). Due to the generation of heat, the filler material is plasticized facilitating the penetration of the tapered cylindrical filler material (404) at the interface of two materials (401) and (402). In this exemplary embodiment, the depth of penetration of the tapered cylindrical filler material (404) is dependent on the properties of the two materials (401), (402) to be joined and the penetration is up to the extent that will enable efficient joining of the two materials.

In this exemplary embodiment, as the tapered cylindrical filler material (404) is further penetrated in the interface region of the two materials clamped together, much more heat is generated and plasticization of material occurs and the interface material is softened. The rotation of the filler material (404) is stopped as-soon-as the filler material (404) is penetrated at the interface of the two materials as required.

In an exemplary embodiment, as illustrated in FIG. 4, the filler material (404) is then pushed and stirred to form intermaterial bond at the interface of two materials (401) and (402). In an exemplary embodiment, as the bottom material (402) is weldable or compatible with the filler material (404), there is an interlock mechanism created between the interfacing surfaces of the filler material and one of the two materials (401, 402) weldable to the filler material to create the inter-material bond at the joining surface.

In an exemplary embodiment, following the formation of the inter-material bond, the filler material (404) is completely filled in the cavity formed at the joint design (403) to complete the friction stir spot welding process. Thus, the two materials are welded and joined together. A proper mixing of the two materials is achieved due to uneven geometry of the filler material that ensures proper welding joint. The two materials are joined together in such a manner that enables high weld strength, proper mixing of the materials, avoiding formation of void in the weld region and the effective removal of oxides and contamination from the weld region.

In this exemplary embodiment of the present invention, a better provision is provided in the joint region (403) enabling addition of either reinforcements or alloying elements or combination of both, collectively referred in FIG. 4 as (411) that facilitates customization of interface properties at the joint region. The reinforcements can be in the form of particulates, short fibers, whiskers or combinations thereof. In this exemplary embodiment, the resultant structure formed due to customization of interface materials can either be a composite or an alloy or combination of both that has more efficient material properties. More specifically, the addition of such reinforcements or alloying elements or combination of both enables in enhancement of the material properties at the weld interface.

In an alternative embodiment of the invention, addition of reinforcements or alloying elements (411) is implemented without formation of joint region (403). In this embodiment, as a result of application of compressive force in combination with the rotational motion, the filler material (404) is penetrated through the upper material (401) to form a small cavity. Then, the filler material (404) is retracted from the interface of the two materials. The small cavity formed due to insertion of the filler material (404) is then filled with either the reinforcement material or the alloying element (411) or combination of both. The filler material is then pushed in the direction of the two materials and is penetrated through the two materials until the two materials are interlocked and joined together. The addition of the reinforcement material enables proper mixing of all the three materials and thereby enhances the interface material properties. The resultant structure formed due to customization of interface materials can either be a composite or an alloy or combination of both that has more efficient material properties. In still another embodiment of the invention, instead of utilization of filler material (404), a non-consumable refill friction spot welding tool (not shown in figure) is penetrated through the upper material (401) to enable plasticization of materials at the interface. The non-consumable refill friction spot welding tool is then retracted from the interface of the two materials which results in formation of small cavity formed at the interface. The cavity formed is filled with the either the reinforcement material or the alloying element (411) or combination of both. Further, the cavity is refilled using refill friction spot welding to complete the joining of the two materials. The addition of the reinforcement material enables proper mixing of all the three materials and thereby enhances the interface material properties. The resultant structure formed due to customization of interface materials can either be a composite or an alloy or combination of both that has more efficient material properties.

Working Example

The novel friction stir spot welding process disclosed in the present invention can be adopted for joining of Al6061 sheet (501) to steel sheet (502) using a third material as a tapered cylindrical filler material in accordance with an exemplary embodiment. In this exemplary embodiment, consider a bottom sheet (502) illustrated in FIG. 5 made of steel material. The steel sheet (502) is clamped with an upper sheet (501) made of Al6061 material.

Figure 5:
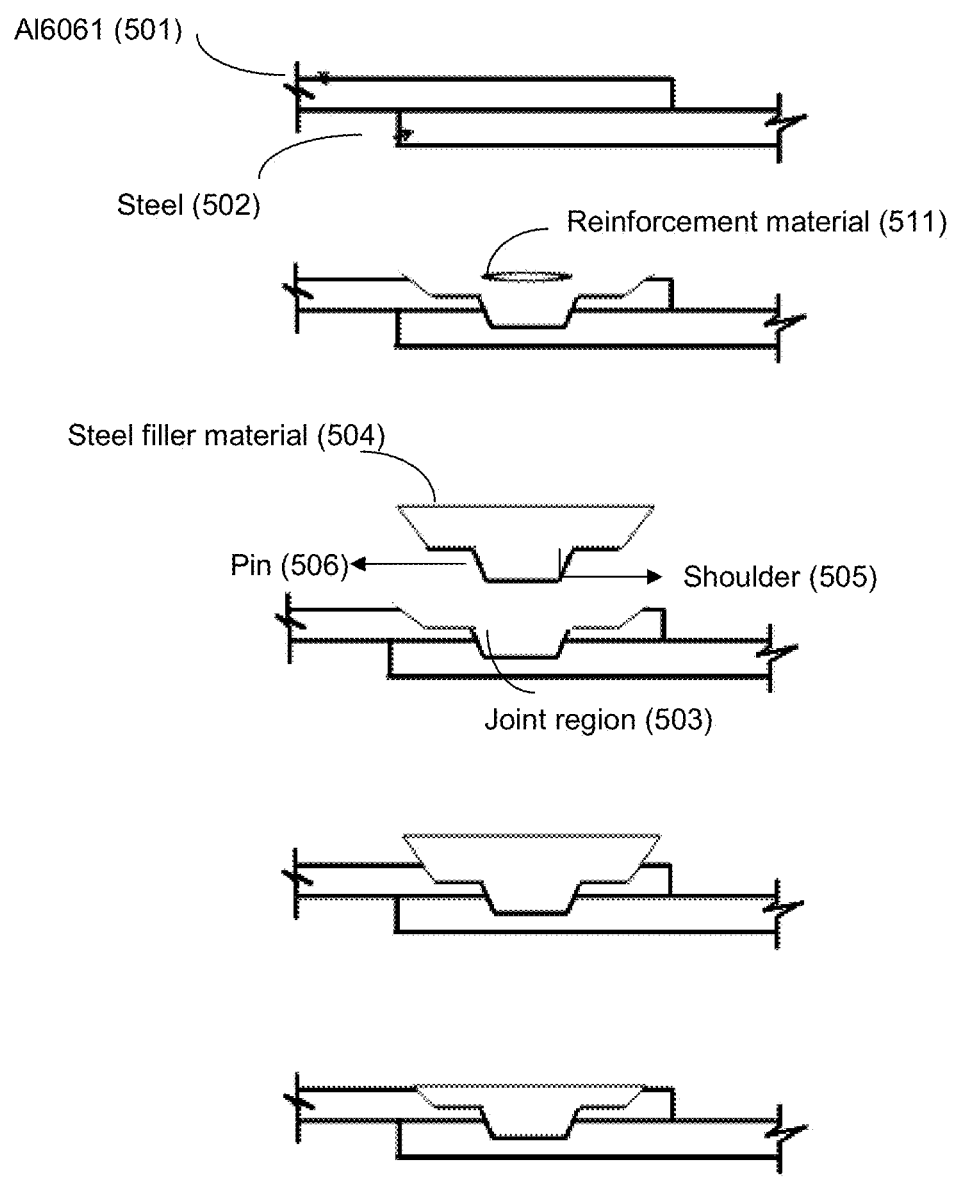
FIG. 5 illustrates an exemplary embodiment for joining Al6061 sheet (501) to steel sheet (502) using a steel filler material (504).

In accordance with this exemplary embodiment, a portion of the upper Al6061 sheet (501) and optionally some portion of the bottom steel sheet (502) are removed by means of a tool. As a result of removal of the portion of both the upper Al6061 sheet (501) and bottom steel sheet (502), a unique joint region (503) is formed at the interface of the two sheets (501,502) as illustrated in FIG. 5. Upon removing the portions, both sheets are left with a cavity created in the joint region (503).

In accordance with another exemplary embodiment of the present invention, some portion of the upper Al6061 sheet (501) is removed while keeping the bottom steel sheet (502) intact. In such scenario, the joint region (503) formed does not interfere the region of the bottom steel sheet (502). More specifically, the joint region is formed (503) at the region constituting the periphery of the upper Al6061 sheet (501) and the receiving surface of the bottom steel sheet (502).

As illustrated in FIG. 5, in this exemplary embodiment, the tapered cylindrical filler material (504) is shown that is utilized for implementing the novel friction spot welding process. In this exemplary embodiment, consider said tapered cylindrical filler material (504) to be used for joining of Al6061 sheet (501) to steel sheet (502) is made of a steel material. In this exemplary embodiment, the tapered cylindrical filler material (504) is selected having geometry similar to said unique joint region (503). However, the size of the tapered cylindrical filler material (504) is slightly bigger than that of the joint region (503). Further, the tapered cylindrical filler material (504) made of steel is further divided into two sections referred to as a shoulder (505) and a pin (506) respectively.

In the exemplary embodiment, referring to FIG. 5, the tapered cylindrical filler material (504) is rotated and pushed in the direction of the two sheets (501) and (502) clamped together. The tapered cylindrical filler material (504) is pushed by application of compressive force. As a result of the rotational motion in combination with compressive force, the tapered cylindrical filler material (504) is moved under pressure until the tapered cylindrical filler material (504) touches the upper Al6061 sheet (501).

In the exemplary embodiment, as a result of strong compressive force, as-soon-as the tapered cylindrical filler material (504) touches the upper Al6061 sheet (501); heat is generated due to the friction between the contacting surface of the tapered cylindrical filler material (504) and the upper Al6061 sheet (501). Due to the generation of heat, the filler material (504) is plasticized facilitating the penetration of the steel filler material (504) at the interface of two sheets, i.e. steel sheet (502) and Al6061 sheet (501).

In the exemplary embodiment, as the cylindrical filler material (504) is further penetrated in the interface region of the two sheets, much more heat is generated as the shoulder section (505) of the cylindrical filler material (504) is in contact with the upper Al6061 sheet (501). As a result of this heat generated, plasticization of material occurs and the interface material is softened. In this exemplary embodiment, the depth of penetration of the tapered cylindrical filler material (504) is dependent on the properties of the two sheets (501), (502) to be joined and the penetration is up to such extent that will enable efficient joining of the two sheets.

In this exemplary embodiment, as the tapered cylindrical filler material (504) is further penetrated in the interface region of the two sheets clamped together, much more heat is generated and plasticization of material occurs and the interface material is softened. The rotation of the filler material (504) is stopped as-soon-as the filler material (504) is penetrated at the interface of the two sheets as required.

In this exemplary embodiment, the filler material (504) is further penetrated and stirred to form metallurgical bond at the interface of two sheets (501) and (502). In this exemplary embodiment, as the bottom steel sheet (502) is weldable or compatible with the steel filler material (504), there is an interlock mechanism created between the interfacing surfaces of the steel filler material and the bottom steel sheet (502). As a result of such interlock mechanism, the bottom steel sheet (502) is interlocked with the steel filler material (504) to create the metallurgical bond at the joining surface.

In the exemplary embodiment, following the formation of the metallurgical bond, the steel filler material (504) is completely filled in the cavity formed at the joint design (503) to complete the friction stir spot welding process. Thus, the two sheets (501, 502) are welded and joined together. A proper mixing of the two materials is achieved due to uneven geometry of the filler material that ensures proper welding joint. The two sheets are joined together in such a manner that enables high weld strength, proper mixing of the materials, avoiding formation of void in the weld region and the effective removal of oxides and contamination from the weld region.

In this exemplary embodiment of the present invention, a better provision is provided in the joint region (503) enabling addition of either reinforcements or alloying elements or combination of both, collectively referred in FIG. 5 as (511) that facilitates customization of interface properties at the joint region (503). The reinforcements can be in the form of particulates, short fibers, whiskers or combinations thereof. In this exemplary embodiment, the resultant structure formed due to customization of interface materials can either be a composite or an alloy or combination of both that possess more efficient material properties. More specifically, addition of such reinforcements or alloying elements or combination of both enables in enhancement of material properties at the weld interface.

Figure 6:
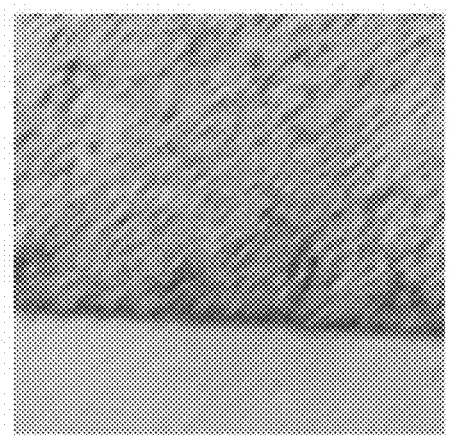
FIG. 6 illustrates a microstructure analysis for the specimens welded using a novel friction stir spot welding process for joining of Al6061 material with a steel material according to an exemplary embodiment of the invention.

The above exemplary embodiment discloses an example of joining of an Al6061 sheet to a steel sheet using steel as a filler material. However, the present invention is can be adopted for joining of any two or more weldable or non-weldable, similar or dissimilar, homogeneous or heterogeneous materials. More particularly, the present invention can be adopted for joining of:

a) Metals to composites material
b) Metals to plastics
c) Composites to plastics d) Plastics to Plastics
e) Composites to composites
f) Metals to Metals FIG. 6 illustrates a microstructure analysis of joining of Al6061 material with a steel material implemented by a novel friction spot welding in accordance to an exemplary embodiment of the present invention. As can be observed from the FIG. 6, the weld integration is enhanced in this novel friction stir spot welding. Further, no weld defects or inclusions are observed at weld interface as those observed in the conventional friction stir spot welding process.

Figure 7:
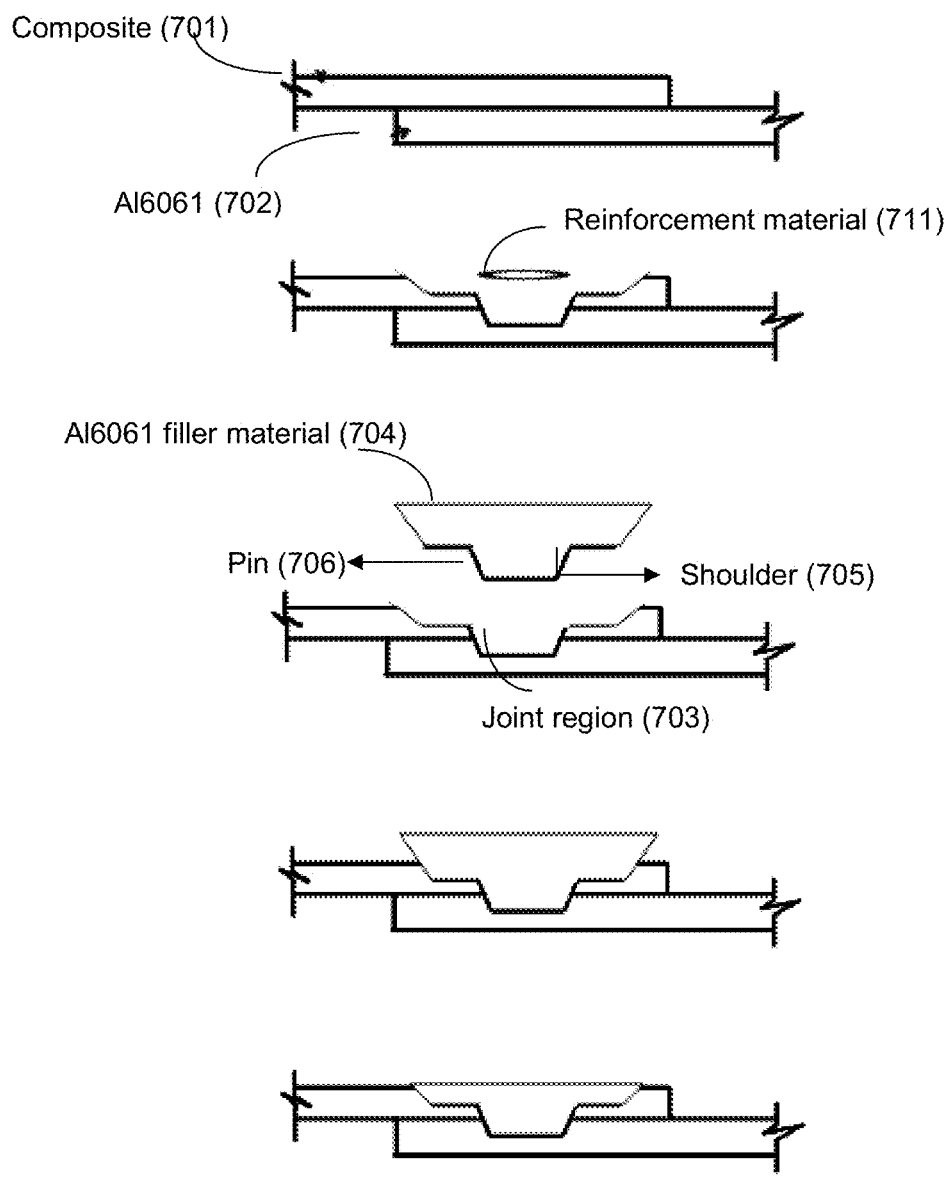
FIG. 7 illustrates an exemplary embodiment for joining composite sheet (701) to Al6061 sheet (702) using an Al6061 filler material (704).

Referring to FIG. 7 is an exemplary embodiment illustrating process of joining a composite sheet (701) to Al6061 sheet (702). The composite sheet (701) may be weldable or non-weldable to the Al6061 sheet (702). In this exemplary embodiment, by implementing the friction stir spot welding process, the composite sheet (701) is joined with the Al6061 sheet (702) due to interlocking of the Al6061 sheet with an Al6061 filler material (704) weldable with the Al6061 sheet (702). The Al6061 filler material (704) is penetrated though the joint region (703) comprising portions of both the composite sheet (701) and Al6061 sheet (702). As the Al6061 sheet (702) is weldable with the Al6061 filler material (704) both these sheets are interlocked which results in joining of upper composite sheet (701) that is interlocked between the Al6061 sheet (702) and the Al6061 filler material (704). As illustrated in FIG. 7, due to addition of reinforcements (711) in the weld interface (703), a composite structure is formed at the weld interface with desired interface material properties.

Figure 8:
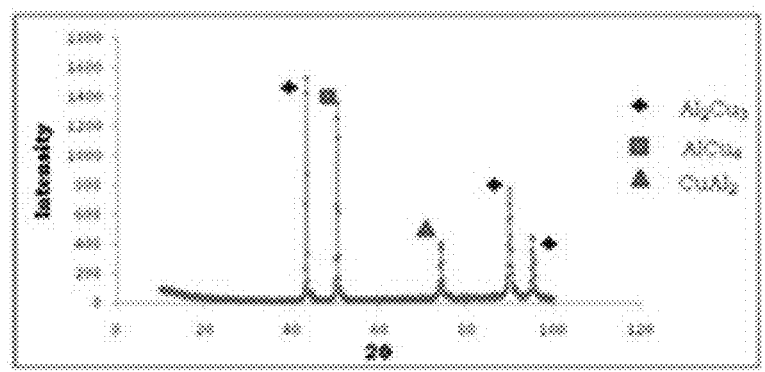
FIGS. 8(A) and 8(B) illustrates X-Ray diffraction Pattern on Tensile Fractured Surface of Al 6062/Cu and Al 6062/SS 304.
Figure 8:
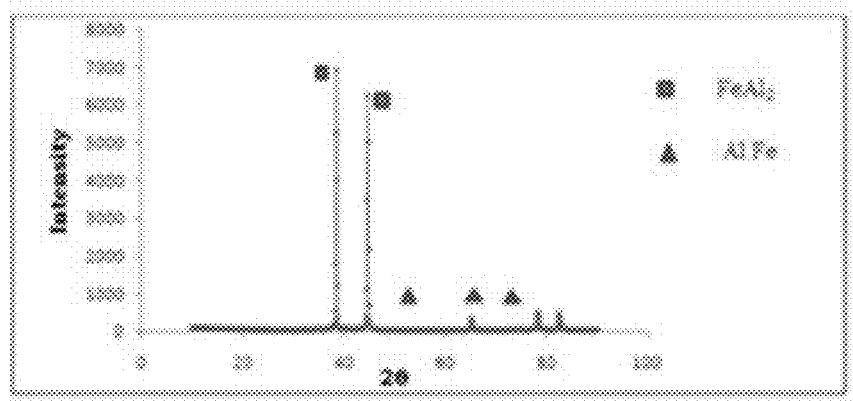

In one embodiment, the present invention enables joining of two similar or dissimilar, weldable or non-weldable materials using vertical direct drive friction welding machine. FIGS. 8(A) and 8(B) illustrates X-Ray diffraction Pattern on Tensile Fractured Surface of Al 6062/Cu and Al 6062/SS 304 respectively. These diffraction patterns indicate that there is a tendency of formation of inter-metallic compounds at the interface of the materials joined using welding process. The formation of inter-metallic compounds depends on interface temperature during the welding process. The formation of such inter-metallic compounds results in the brittle weld and deterioration of weld properties. In this embodiment, the present invention enables addition of reinforcements or alloys at the interface of the two joining materials that enhances material properties and reduces the tendency of formation of inter-metallic compounds at the weld interface as per requirements.

Figure 9:
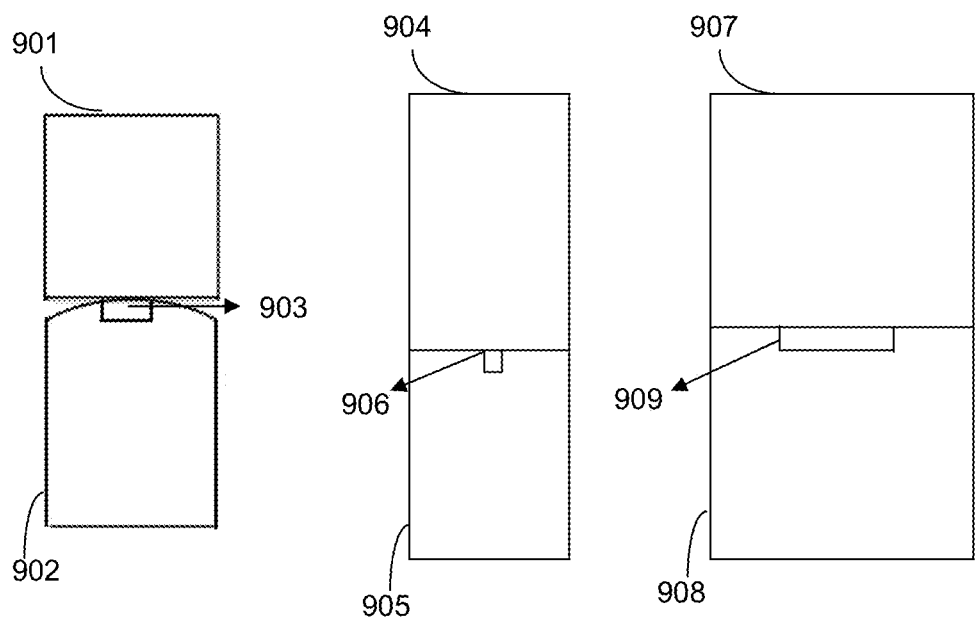
FIGS. 9(A), 9(B) and 9(C) illustrates different configurations of joining two materials using vertical direct drive friction welding machine according to one embodiment of the invention.

FIGS. 9(A), 9(B) and 9(C) illustrated different configurations of joining two materials using vertical direct drive friction welding machine according to one embodiment of the invention.

FIG. 9(A) refers to joining of two dissimilar materials in an exemplary embodiment of the present invention. As illustrated in FIG. 9(A), a harder material, preferably steel (901) is clamped with a softer material, preferably an aluminum alloy (902) having a unique geometry. A provision in the form of cavity (903) is provided at the interface of the steel (901) and Al alloy (902) materials. In this exemplary embodiment, the cavity (903) is filled with either reinforcements or alloying elements or combination of both that facilitates customization of interface properties at the joint region. The reinforcements can be in the form of particulates, short fibers, whiskers or combinations thereof. In this exemplary embodiment, the resultant structure formed due to customization of interface materials can either be a composite or an alloy or combination of both that has more efficient material properties. The addition of such reinforcements or alloying elements or combination of both enables in enhancement of the material properties at the weld interface. In this exemplary embodiment, the unique geometry of the softer material (902) helps in lower material consumption. Further, the facilitation of such unique geometry enables to achieve the weld at lower temperature that reduces the tendency of formation of inter-metallic compounds at the weld interface. This helps in reducing the probability of brittle weld and deterioration of weld properties at the weld interface. Further, addition of reinforcements or alloying elements facilitates customization and enhancement of interface properties as per the requirements of specific applications.

Similarly, FIGS. 9(B) and 9(C) illustrates different configurations that enable joining of the similar or dissimilar materials using vertical direct drive friction welding machine according to exemplary embodiments of the invention. In these embodiments, a cavity is formed at the interface of the two joining materials that provides a provision to add reinforcements or alloying elements or combination of both. The addition of reinforcements or alloying elements facilitates customization and enhancement of interface properties as per the requirements of specific applications. Further, due to customization of interface material properties, the weld strength is enhanced.

ADVANTAGES OF THE INVENTION

The present invention helps in joining of two or more weldable or non-weldable, similar or dissimilar, homogeneous or heterogeneous materials with a filler material that is weldable with at least one of the materials to be joined.

The present invention avoids formation of void in the middle of the weld region after welding.

The present invention enables effective removal of oxides and other contamination from the weld interface as a result of relative motion between the welding materials.

The present invention enables higher weld strength and proper mixing of materials or sheets used for lap joint welding.

The invention claimed is:
1. A method for joining of two or more weldable or non-weldable materials by using a friction stir spot welding, the method comprising steps of:
   creating a cavity at a centre of overlapped welding surface of a first material and a second material by removing a portion of predefined geometry therefrom at least one of the first and the second materials to form a joint region;
   adding either reinforcement or an alloying element or combination of both into said created cavity in the joint region;
   penetrating a tapered cylindrical filler material with a similar geometry design as that of said cavity in the joint region by rotating said tapered cylindrical filler material in combination with compressive force thereto;
   interlocking the tapered cylindrical filler material with at least one of the first and second materials that is weldable with the filler material to form an inter-material bond;
   welding the first material with the second material by filling the cavity formed in the joint region with the tapered cylindrical filler material; and
   generating a composition structure at the weld interface with customized interface material properties.
2. The method of claim 1, wherein said first material is selected from a group consisting of a metal, a composite, a plastic and combinations thereof.

3. The method of claim 1, wherein said second material is selected from a group consisting of a metal, a composite, a plastic and combinations thereof.

4. The method of claim 1, wherein said tapered cylindrical filler material is selected from a group consisting of a metal, a composite, a plastic and combinations thereof.

5. The method of claim 1, wherein said reinforcement is in the form of a particulate, a short fiber, a whisker or combinations thereof.

6. The method of claim 1, wherein said tapered cylindrical filler material is selected that is weldable with both the first material and the second material, or at least with the second material.

7. The method of claim 1, wherein a size of the tapered cylindrical filler material is slightly bigger than that of said joint region.

8. The method of claim 1, wherein said inter-material bond enables filling of the tapered cylindrical filler material in the cavity to enable welding of the first material with the second material.

9. The method of claim 1, wherein said composition structure generated at the weld interface consists of either a composite or an alloy of desired elements or combination of both that facilitates one or more desired weld interface properties.

10. An apparatus for joining of two or more weldable or non-weldable materials by using an friction stir spot welding process, the apparatus comprising:
- a tool adapted to remove a predefined portion of a first material and a second material to be welded to create a joint region;
- a filling means to add either reinforcement or an alloying element or combination of both into said joint region; and
- a welding-machine attached to a tapered cylindrical filler material weldable to at least one of the two materials having a pin adapted to penetrate the filler material into the cavity and a shoulder adapted to rotatably create a frictional heat at the adjoining surfaces to complete the welding of the two materials and to generate a composition structure at the weld interface with customized interface material properties.

11. The apparatus of claim 10, wherein said first material is selected from a group consisting of a metal, a composite, a plastic and combinations thereof.

12. The apparatus of claim 10, wherein said second material is selected from a group consisting of a metal, a composite, a plastic and combinations thereof.

13. The apparatus of claim 10, wherein said tapered cylindrical filler material is selected from a group consisting of a metal, a composite, a plastic and combinations thereof.

14. The apparatus of claim 10, wherein said reinforcement is in the form of a particulate, a short fiber, a whisker or combinations thereof.

15. The apparatus of claim 10, wherein said tapered cylindrical filler material is selected that is weldable with both the first material and the second material, or at least with the second material.

16. The apparatus of claim 10, wherein a size of the tapered cylindrical filler material is slightly bigger than that of said joint region.

17. The apparatus of claim 10, wherein said inter-material bond enables filling of the tapered cylindrical filler material in the cavity to enable welding of the first material with the second material.

18. The apparatus of claim 10, wherein said composition structure generated at the weld interface consists of either a composite or an alloy of desired elements or combination of both that facilitates one or more desired weld interface properties.

* * * * *